(12) United States Patent
Forsblom

(10) Patent No.: US 10,061,401 B2
(45) Date of Patent: Aug. 28, 2018

(54) PHYSICAL ORIENTATION CALIBRATION FOR MOTION AND GESTURE-BASED INTERACTION SEQUENCE ACTIVATION

(71) Applicant: ADTILE TECHNOLOGIES INC., San Diego, CA (US)

(72) Inventor: Nils Forsblom, San Diego, CA (US)

(73) Assignee: Adtile Technologies Inc., San Diego, CA (US)

( * ) Notice: Subject to any disclaimer, the term of this patent is extended or adjusted under 35 U.S.C. 154(b) by 81 days.

(21) Appl. No.: 14/802,649

(22) Filed: Jul. 17, 2015

(65) Prior Publication Data

US 2016/0018908 A1 Jan. 21, 2016

Related U.S. Application Data

(60) Provisional application No. 62/026,436, filed on Jul. 18, 2014, provisional application No. 62/055,561, filed on Sep. 25, 2014.

(51) Int. Cl.
| | |
|---|---|
| *G09G 5/00* | (2006.01) |
| *G06F 3/0346* | (2013.01) |
| *G01C 25/00* | (2006.01) |
| *G06T 11/60* | (2006.01) |

(52) U.S. Cl.
CPC .......... *G06F 3/0346* (2013.01); *G01C 25/00* (2013.01); *G01C 25/005* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 8,631,358 | B2 | 1/2014 | Louch |
| 2007/0136132 | A1 | 6/2007 | Weiser et al. |
| 2009/0319166 | A1 | 12/2009 | Khosravy et al. |
| 2010/0257475 | A1 | 10/2010 | Smith et al. |
| 2010/0269030 | A1 | 10/2010 | Dugonjic et al. |
| 2011/0173204 | A1 | 7/2011 | Murillo et al. |

(Continued)

OTHER PUBLICATIONS

International Search Report and Written Opinion for PCT/US14/69554; dated Mar. 6, 2015; 11 pages.

(Continued)

*Primary Examiner* — Peter Hoang
(74) *Attorney, Agent, or Firm* — Stetina Brunda Garred & Brucker

(57) ABSTRACT

The presentation of interaction sequences to a user on a mobile communications device is disclosed. A first external input corresponding to a triggering of an interaction sequence delivery is received on a first input modality. An overlay is displayed in a graphical user interface in response to receiving the external input. Interaction sequence invocation instructions are displayed within the overlay. A second external input is received on a second input modality different from the first input modality. The second external input is translated to a set of quantified values. An interaction sequence results content is then displayed within the overlay in response to a substantial match between the set of quantified values translated from the received second external input to the set of predefined values corresponding to the interaction sequence invocation instructions.

9 Claims, 8 Drawing Sheets

(56) References Cited

U.S. PATENT DOCUMENTS

| | | | |
|---|---|---|---|
| 2011/0270679 A1 | 11/2011 | Tziortzis et al. | |
| 2012/0041767 A1 | 2/2012 | Hoffman et al. | |
| 2012/0246596 A1 | 9/2012 | Ording et al. | |
| 2012/0310717 A1 | 12/2012 | Kankainen | |
| 2014/0280517 A1* | 9/2014 | White | H04L 67/22 709/203 |
| 2014/0288873 A1* | 9/2014 | Czompo | G01C 19/5776 702/141 |
| 2015/0062179 A1* | 3/2015 | Matas | G06F 3/04845 345/648 |
| 2015/0286279 A1* | 10/2015 | Lim | G06F 3/017 715/863 |

OTHER PUBLICATIONS

David Talbot, What Apple'S M7 Motion-Sensing Chip Could Do, Sep. 25, 2013, 2 Pages.

Chris Brandrick, Apple's M7 Chip is the Trojan Horse for Its Wearable Computing Plans, Sep. 13, 2013, 7 Pages.

\* cited by examiner

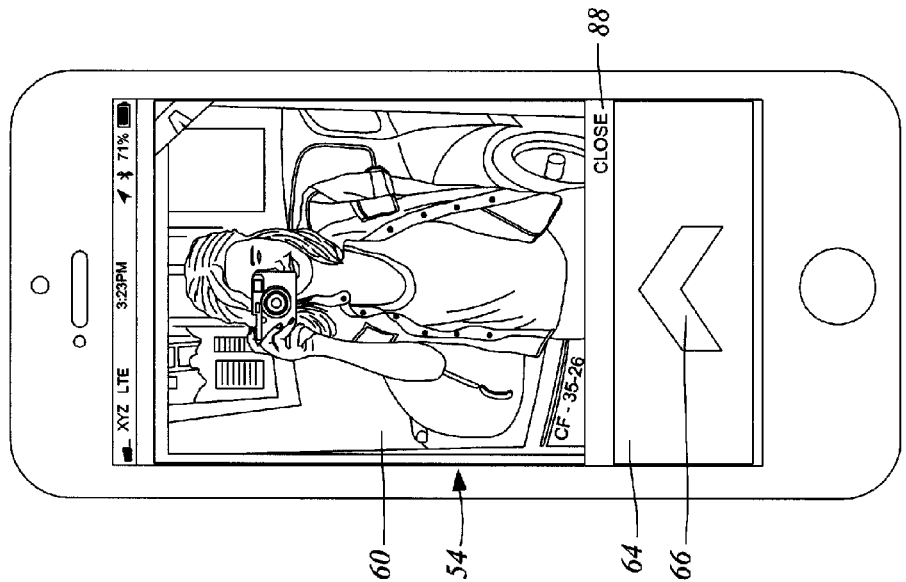
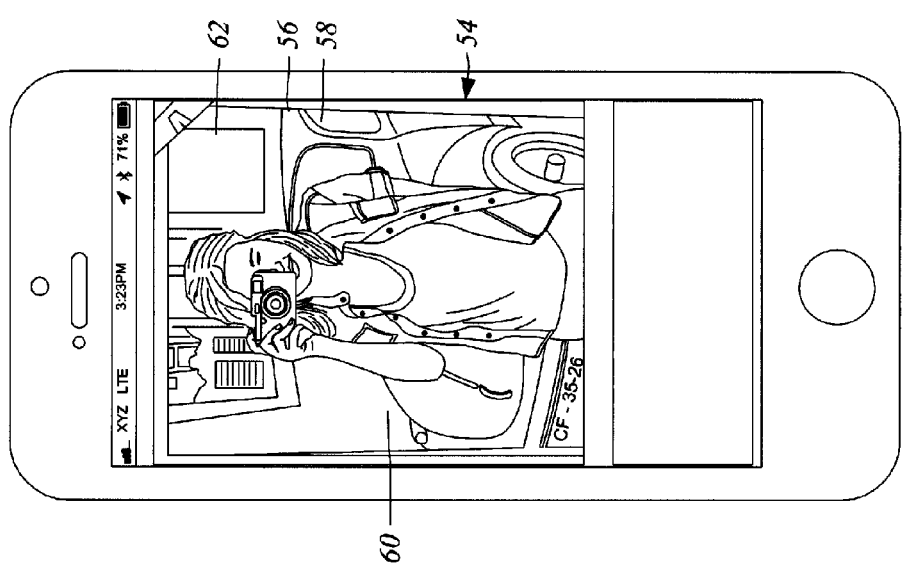
FIG. 3
FIG. 4

PHYSICAL ORIENTATION CALIBRATION FOR MOTION AND GESTURE-BASED INTERACTION SEQUENCE ACTIVATION

CROSS-REFERENCE TO RELATED APPLICATIONS

This application relates to U.S. Provisional Application No. 62/026,436 filed Jul. 18, 2014 entitled "PHYSICAL ORIENTATION CALIBRATION FOR MOTION AND GESTURE-BASED MOBILE ADVERTISING ACTIVATION SEQUENCE" and U.S. Provisional Application No. 62/055,561 filed Sep. 25, 2014 entitled "PHYSICAL ORIENTATION CALIBRATION FOR MOTION AND GESTURE-BASED MOBILE ADVERTISING ACTIVATION SEQUENCE," and also relates to U.S. application Ser. No. 14/160,257 filed Jan. 21, 2014 entitled "MOTION AND GESTURE-BASED ADVERTISING ACTIVATION," which relates to and claims the benefit of U.S. Provisional Application No. 61/921,819 filed Dec. 30, 2013 entitled "MOTION AND GESTURE BASED MOBILE AD ACTIVATION MECHANICS", the entire disclosure of each which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to online services and user interfaces therefor, and more particularly, to calibrating the physical orientation of input devices for motion and gesture-based interaction sequence activation.

2. Related Art

Conventional online media business practices involve providing information or services free of charge or at minimal cost to the primary audience in exchange for being presented with advertising that is paid for by advertisers. As referenced herein, online media or content providers encompasses the Internet counterparts of traditional television, radio, and print news and magazine outlets, as well as search engines and other such aggregators, social networking sites, individual websites/web logs (blogs) and the like. Advertising revenue is understood to offset the costs of server maintenance, network bandwidth, and other technical operational aspects, as well as the costs for producing the content itself, including pay for the authors, editors, and various other personnel involved in production. Similar practices have been extended to software applications, particularly those running on mobile devices, which can be provided free to the user but subsidized by advertising revenue.

Advertising content can be integrated with the presentation of the primary content (news articles, application functionality, etc.) in various ways. One of the most common is the banner ad, which is a graphic designed by the advertiser and placed in a prominent location within a content page. Several technical solutions that achieve this functionality are known in the art, such as embedding the banner advertisement in-line with the content but laid out on the top, side, or bottom ends of the page, displaying the banner advertisement in a separate static frame that does not move when scrolling, and so forth. Besides static graphics, animations, sound, video and different interactive elements can be also be integrated into the banner ad. Clicking on the banner advertisement typically directs the user to the advertiser's website, where additional information and an opportunity to purchase the advertised product can be provided.

Other advertising presentation techniques are also known in the art. These include pop-up windows, floating advertisements that are overlaid on the content until some additional interaction, such as pressing a close button, is completed, and interstitial ads, which require a reader to view an advertisement before being provided access to the content page. These techniques vary in terms of obtrusiveness and effectiveness, and varying forms of online advertising can be deployed depending on the desires of the content provider, the advertiser, and the user base.

As these conventional advertising presentations are utilized more, their ubiquity has slowly led to a decrease in their impact and effectiveness. Most end users tend to regard conventional advertisements as boring at best, and thus are ignored. In many cases, the advertisements may be annoying as interfering with the viewing of actual content. Further exacerbating this is that while the aforementioned conventional advertising presentation techniques were originally developed for viewing on browser platforms with ample screen real estate such as desktop and laptop computers, the user base of mobile devices such as smart phones has been expanding. Thus, an increasing number of users are browsing Internet websites and interacting with apps on mobile devices, and hence being presented with advertisements on limited screen real estate. Whether implemented on content websites or software apps, existing advertisement presentations require modifications to fit within the constraints of the mobile device interface. These factors are understood to increase the annoyance factor, and contribute to decreasing value of conventional online advertisements.

There is also a need in the art for such presentations to exploit the mobile device form factor. There are myriad of positions and orientations from which users can interact with such mobile devices; for example, it is common for users to lay on a bed, sofa, or other like comfortable horizontal surface, while interacting with the device with it facing the ground, sideways, and so forth. Conventionally, user interfaces make certain assumptions regarding device orientation, and thus constrains the user thereto. As such, there is also a need in the art for these presentations to accommodate interactions from varied positions and orientations.

BRIEF SUMMARY

In accordance with one embodiment of the present disclosure, there is a method for calibrating an orientation of a mobile communications device. The method may include activating one or more sensors of the mobile communications device, and then requesting an initialization sensor reading from the one or more sensors of the mobile communications device. The initialization sensor reading may including include vector magnitudes along a plurality of motion axes. The method may also include translating the vector magnitudes of the plurality of motion axes to a set of quaternions. Thereafter, there may be a step of requesting a mobile platform identifier from the mobile communications device. Then, the method may include correlating the requested platform identifier to a platform-specific coordinate system. There may additionally be a step of transforming the set of quaternions corresponding to the initialization sensor reading to the platform-specific coordinate system with a rotation matrix.

Another embodiment of the present disclosure is a method for presenting interaction content to a user on a mobile communications device. The method may include displaying content on a graphical user interface of the mobile communications device. An activatable in-stream graphic element may be displayed in-line with the content. There may also be a step of receiving a first external input corresponding to a triggering of the activatable in-stream graphic element. The first external input may be received on a first input modality of the mobile communications device. The method may further include displaying an overlay in the graphical user interface that partially covers the content in response to receiving the first external input corresponding to the triggering of the activatable in-stream graphic element. There may also be a step of calibrating an initial orientation of the mobile communications device in response to receiving the first external input, and then displaying, within the overlay, interaction sequence invocation instructions in response to receiving the first external input. Furthermore, the method may include receiving a second external input on a second input modality of the mobile communications device different from the first input modality after the first external input corresponding to the triggering of the activatable in-stream graphic element is received. This may take place while the interaction sequence invocation instructions are being displayed within the overlay. There may also be a step of translating the second external input to at least a set of quantified values. Furthermore, there may be a step of displaying, within the overlay, content that is separate from the interaction sequence invocation instructions upon an evaluation of a substantial match between the set of quantified values translated from the received second external input and referenced to the initial orientation to the set of predefined values corresponding to the interaction sequence invocation instructions.

Certain other embodiments of the present disclosure contemplate respective computer-readable program storage media that each tangibly embodies one or more programs of instructions executable by a data processing device to perform the foregoing methods. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is an example graphical user interface of an app running on the mobile communications device;

FIG. 4 shows the graphical user interface displaying an interaction sequence overlay;

DETAILED DESCRIPTION

The present disclosure encompasses various embodiments of methods for motion and gesture-based mobile interaction sequence activation. The detailed description set forth below in connection with the appended drawings is intended as a description of the several presently contemplated embodiments of these methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
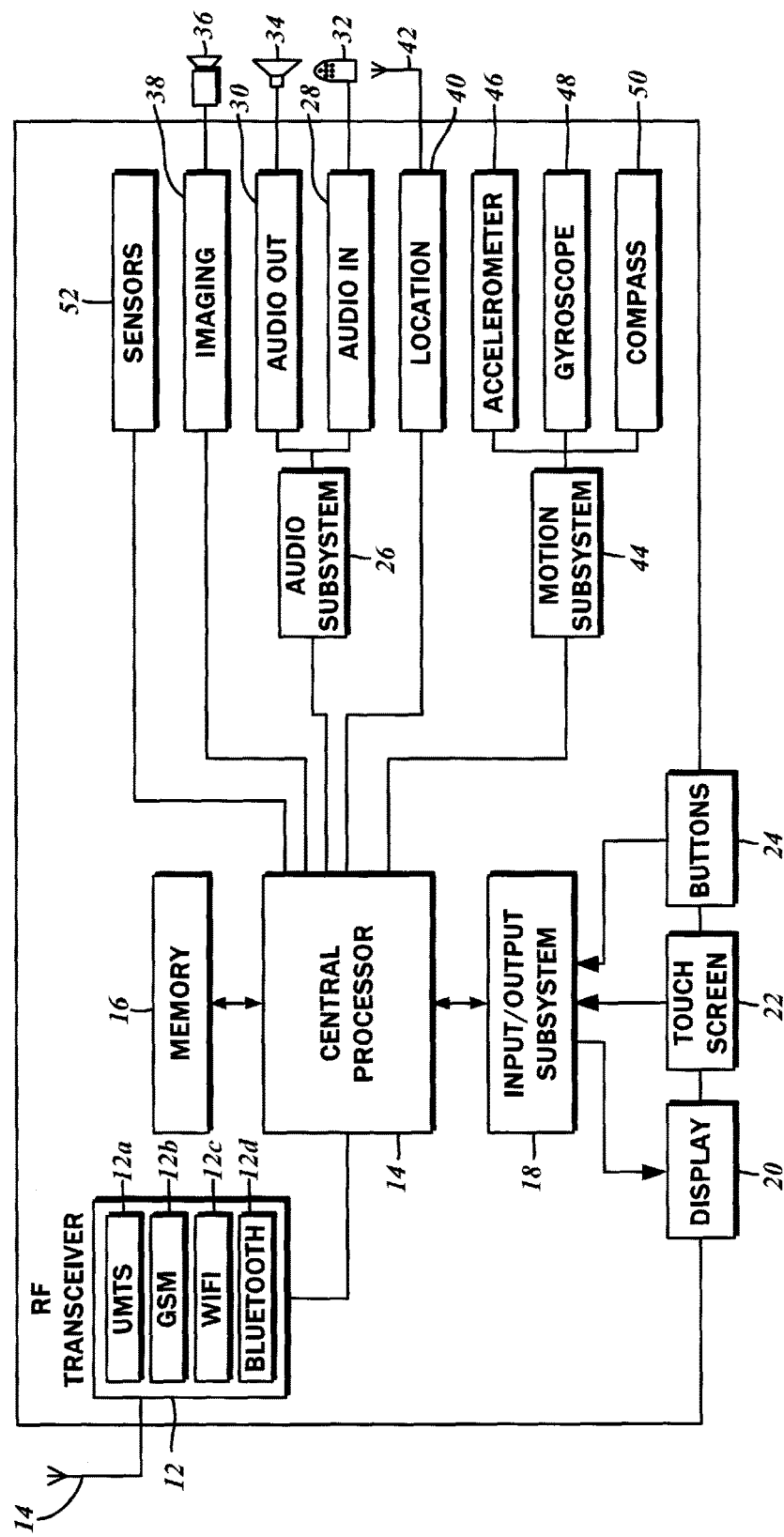
FIG. 1 is a block diagram illustrating the components of a mobile communications device utilized in various embodiments of the present disclosure.

FIG. 1 illustrates one exemplary mobile communications device 10 on which various embodiments of the present disclosure may be implemented. The mobile communications device 10 may be a smartphone, and therefore include a radio frequency (RF) transceiver 12 that transmits and receives signals via an antenna 14. Conventional devices are capable of handling multiple wireless communications modes simultaneously. These include several digital phone modalities such as UMTS (Universal Mobile Telecommunications System), 4G LTE (Long Term Evolution), and the like. For example, the RF transceiver 12 includes a UMTS module 12*a*. To the extent that coverage of such more advanced services may be limited, it may be possible to drop down to a different but related modality such as EDGE (Enhanced Data rates for GSM Evolution) or GSM (Global System for Mobile communications), with specific modules therefor also being incorporated in the RF transceiver 12, for example, GSM module 12*b*. Aside from multiple digital phone technologies, the RF transceiver 12 may implement other wireless communications modalities such as WiFi for local area networking and accessing the Internet by way of local area networks, and Bluetooth for linking peripheral devices such as headsets. Accordingly, the RF transceiver may include a WiFi module 12*c* and a Bluetooth module 12*d*. The enumeration of various wireless networking modules is not intended to be limiting, and others may be included without departing from the scope of the present disclosure.

The mobile communications device 10 is understood to implement a wide range of functionality through different software applications, which are colloquially known as "apps" in the mobile device context. The software applications are comprised of pre-programmed instructions that are executed by a central processor 14 and that may be stored on a memory 16. The results of these executed instructions may be output for viewing by a user, and the sequence/parameters of those instructions may be modified via inputs from the user. To this end, the central processor 14 interfaces with an input/output subsystem 18 that manages the output functionality of a display 20 and the input functionality of a touch screen 22 and one or more buttons 24.

In a conventional smartphone device, the user primarily interacts with a graphical user interface that is generated on the display 20 and includes various user interface elements that can be activated based on haptic inputs received on the touch screen 22 at positions corresponding to the underlying displayed interface element. One of the buttons 24 may serve a general purpose escape function, while another may serve to power up or power down the mobile communications device 10. Additionally, there may be other buttons and switches for controlling volume, limiting haptic entry, and so forth. Those having ordinary skill in the art will recognize other possible input/output devices that could be integrated into the mobile communications device 10, and the purposes such devices would serve. Other smartphone devices may include keyboards (not shown) and other mechanical input devices, and the presently disclosed interaction methods with the graphical user interface detailed more fully below are understood to be applicable to such alternative input modalities.

The mobile communications device 10 includes several other peripheral devices. One of the more basic is an audio subsystem 26 with an audio input 28 and an audio output 30 that allows the user to conduct voice telephone calls. The audio input 28 is connected to a microphone 32 that converts sound to electrical signals, and may include amplifier and ADC (analog to digital converter) circuitry that transforms the continuous analog electrical signals to digital data. Furthermore, the audio output 30 is connected to a loudspeaker 34 that converts electrical signals to air pressure waves that result in sound, and may likewise include amplifier and DAC (digital to analog converter) circuitry that transforms the digital sound data to a continuous analog electrical signal that drives the loudspeaker 34. Furthermore, it is possible to capture still images and video via a camera 36 that is managed by an imaging module 38.

Due to its inherent mobility, users can access information and interact with the mobile communications device 10 practically anywhere. Additional context in this regard is discernible from inputs pertaining to location, movement, and physical and geographical orientation, which further enhance the user experience. Accordingly, the mobile communications device 10 includes a location module 40, which may be a Global Positioning System (GPS) receiver that is connected to a separate antenna 42 and generates coordinates data of the current location as extrapolated from signals received from the network of GPS satellites. Motions imparted upon the mobile communications device 10, as well as the physical and geographical orientation of the same, may be captured as data with a motion subsystem 44, in particular, with an accelerometer 46, a gyroscope 48, and a compass 50, respectively. Although in some embodiments the accelerometer 46, the gyroscope 48, and the compass 50 directly communicate with the central processor 14, more recent variations of the mobile communications device 10 utilize the motion subsystem 44 that is embodied as a separate co-processor to which the acceleration and orientation processing is offloaded for greater efficiency and reduced electrical power consumption. One exemplary embodiment of the mobile communications device 10 is the Apple iPhone with the M7 motion co-processor.

The components of the motion subsystem 44, including the accelerometer 46, the gyroscope 48, and the compass 50, while shown as integrated into the mobile communications device 10, may be incorporated into a separate, external device. This external device may be wearable by the user and communicatively linked to the mobile communications device 10 over the aforementioned data link modalities. The same physical interactions contemplated with the mobile communications device 10 to invoke various functions as discussed in further detail below may be possible with such external wearable device.

There are other sensors 52 that can be utilized in the mobile communications device 10 for different purposes. For example, one of the other sensors 52 may be a proximity sensor to detect the presence or absence of the user to invoke certain functions, while another may be a light sensor that adjusts the brightness of the display 20 according to ambient light conditions. Those having ordinary skill in the art will recognize that other sensors 52 beyond those considered herein are also possible.

With reference to the flowchart of FIG. 2, one embodiment of a method for presenting interaction sequences to the user on the mobile communications device 10 will be described. As shown in FIG. 3, there is a graphical user interface 54 of an app running on the mobile communications device. By way of example only and not of limitation, the app involves sharing/viewing photographs, and within a main screen area 56 there may be a plurality of content panels 58 within which a picture or content 60 is rendered. Thus, the method begins with a step 200 of displaying the content 60 on the graphical user interface 54. Scrolling upwards or downwards according to standard touch input navigation reveals additional content panels 58 with different pictures. Although photo sharing/viewing app is depicted, it will be appreciated that any other type of content may be presented in a similar manner, such as news and blog articles and so forth.

In further detail, on the upper right hand corner of the content panel 58, there is an activatable graphic element 62 that is a part of an interaction sequence deliver sub-application embedded within the content 60. As referenced broadly herein, the term embedded with respect to the interaction sequence delivery sub-application may mean an executable or scripted module that is incorporated into the underlying app, a single instruction or reference that invokes the functionality of the interaction sequence delivery sub-application, or any other modality of calling a separate set of instructions that perform the function of delivering the interaction sequence as contemplated. In order for the user to continue to experience the underlying app and/or content in the same manner as before, any other suitable unobtrusive location within the graphical user interface 54 that indicates an interaction sequence is available to be experienced can be substituted.

Continuing on, the method includes a step 202 of receiving a first external input corresponding to a triggering of the activatable graphic element 62 of the interaction sequence delivery sub-application. The first external input is received on a first input modality. In the context of the mobile communications device 10 with a touch user interface, this refers to receiving a haptic contact on the touch screen 22 at a location corresponding in position to the displayed activatable graphic element 62. Other ways of providing the same input are also possible.

As best shown in FIG. 4, and in accordance with a step 204, an overlay 64 is displayed on the graphical user interface 54 in response to the foregoing receipt of the first external input that corresponds to the triggering of the activatable graphic element 62. According to various embodiments, the overlay 64 at least partially covers the content 60. An animation effect may be utilized to bring the overlay 64 into view. One example of such an animation effect may be gradually raising the interaction sequence overlay 64 from the bottom of the graphical user interface 54. Simultaneously, the content panels 58 can be faded into the background by darkening the same via another animation effect. Other effects that subdue the content panels 58 may also be utilized. To indicate to the user that additional content to be shown within the overlay 64 is forthcoming. A transition graphic 66 may be displayed as the animation effect of the overlay 64 progresses.

Although the step 204 of displaying the overlay 64 has been described in the context of one embodiment in which the step is responsive to receiving the first external input that triggers the activatable graphic element 62, alternative embodiments are not limited thereto. For example, the overlay 64 may be displayed in response to a first external input that is independent of the graphical user interface 54 and any user interactions therewith. The first input modality of the mobile communications device 10 could be an indoor positioning system (beacon) receiver. Upon receiving a signal from an indoor positioning system transmitter by virtue of the mobile communications device 10 being brought in proximity thereto where such reception becomes possible, it is evaluated as such. In this case, the first external input could be the receipt of the beacon signal. Similarly, establishing a network link over particular wireless local area networks, being in a particular location as detected by the location module 40, being in a location with a particular type of weather reported, and so forth, can invoke the display of the overlay 64. Additional context can be discerned from nearby connected devices such as thermostats, televisions, lights, door locks, vehicles, and the like. Furthermore, the interaction with the graphical user interface as in the previously described embodiment could be combined with location triggering to further refine the type of interaction sequence content that are presented to the user.

Figure 5:
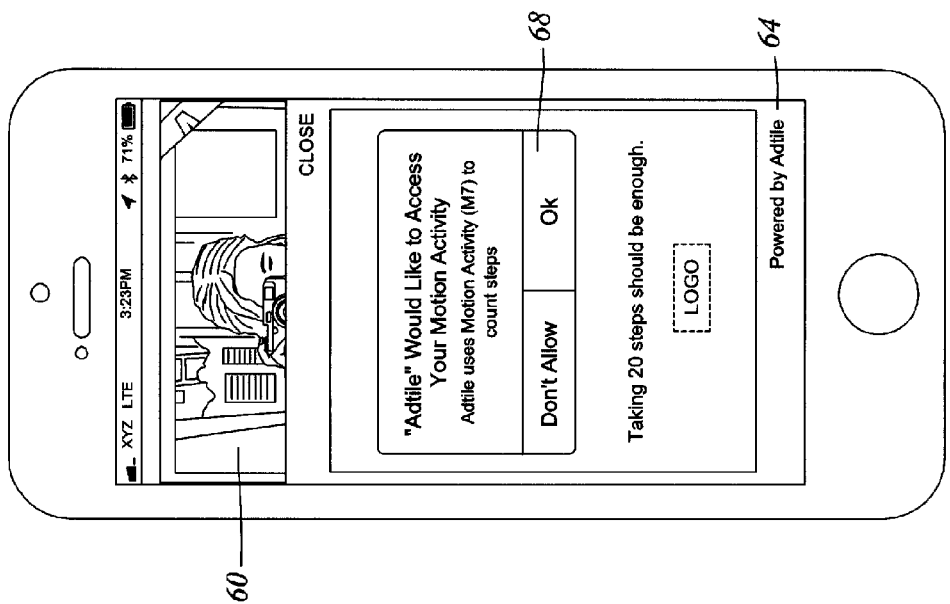
FIG. 5 shows the graphical user interface displaying a consent screen prior to accessing a motion subsystem of the mobile communications device for the first time.

The present disclosure contemplates the invocation of interaction sequences in response to various motion/gesture inputs applied to the mobile communications device 10 by the user. Such inputs are detected, measured, and quantified by the motion subsystem 44. The conventions of certain mobile communications devices 10 dictate obtaining consent from the user prior to the use of this data due to privacy concerns. As shown in FIG. 5, a system-generated consent screen 68 is displayed over the overlay 64 as well as the content 60 if it is the first time the motion subsystem 44 is being accessed from the underlying app. When consent is provided, subsequent accesses to the motion subsystem 44 do not require further confirmation from the user.

Figure 2:
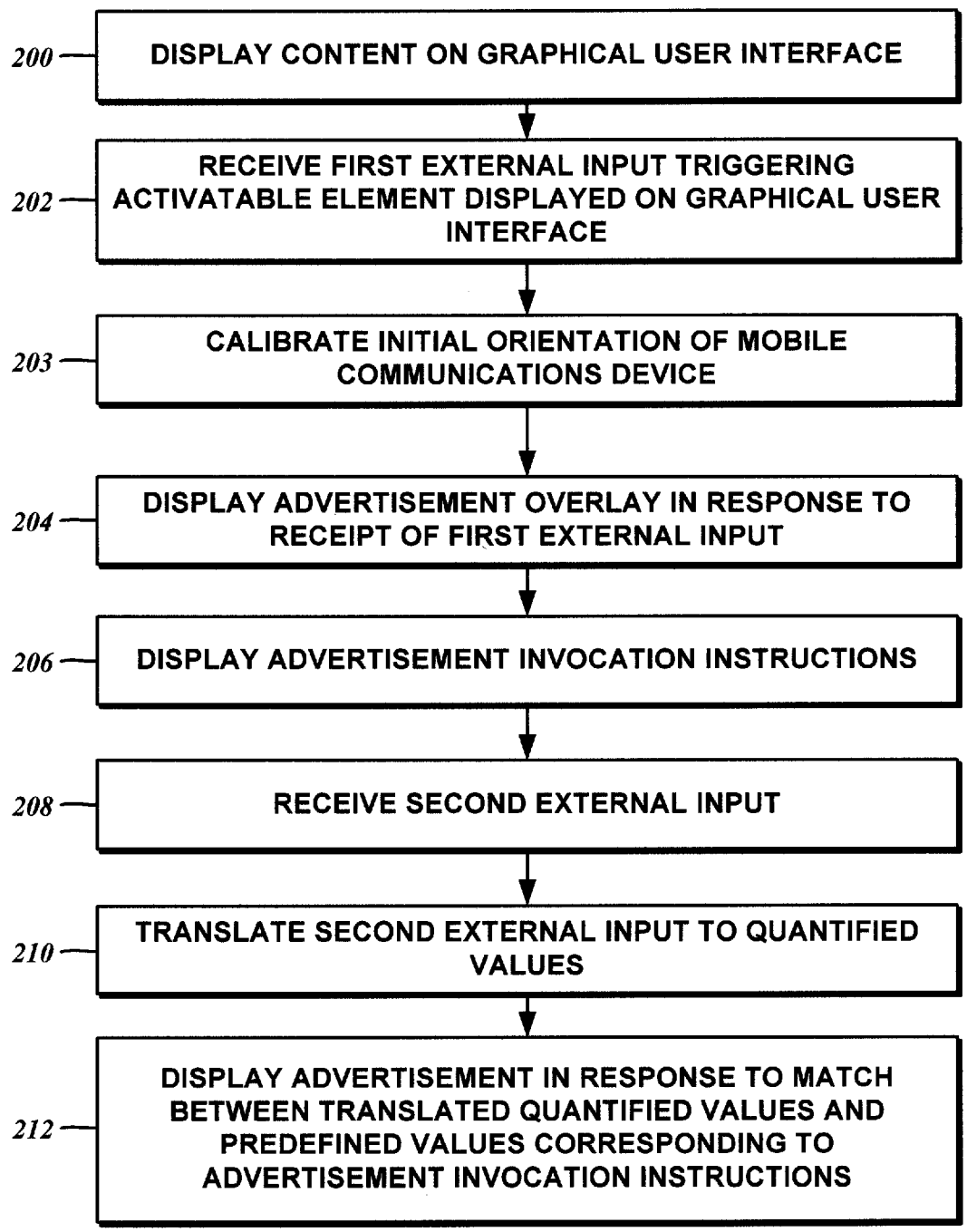
FIG. 2 is a flowchart illustrating an embodiment of a method for presenting interaction sequences to a user on a mobile communications device.
Figure 6:
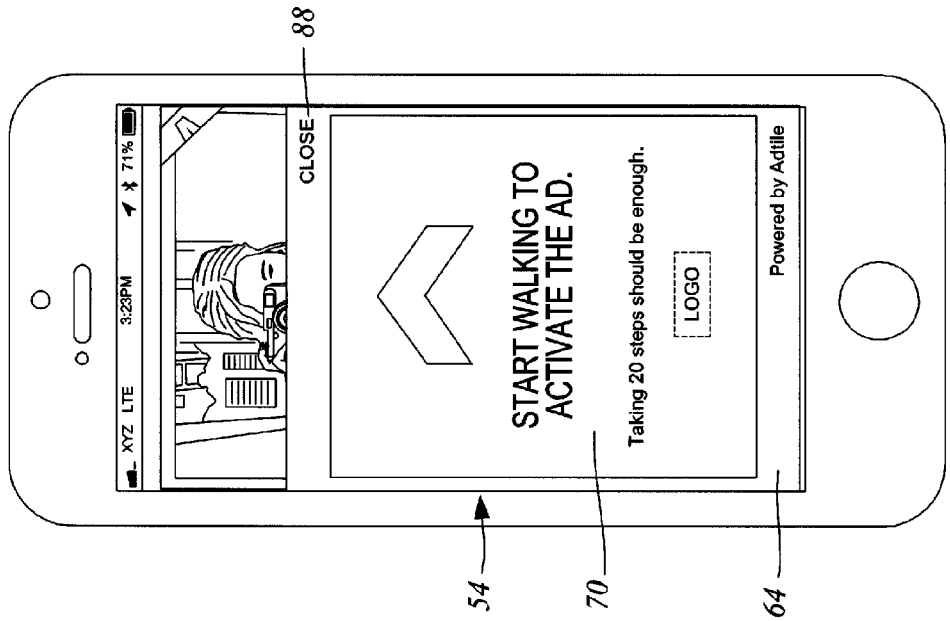
FIG. 6 shows the graphical user interface displaying interaction sequence invocation instructions.
Figure 7:
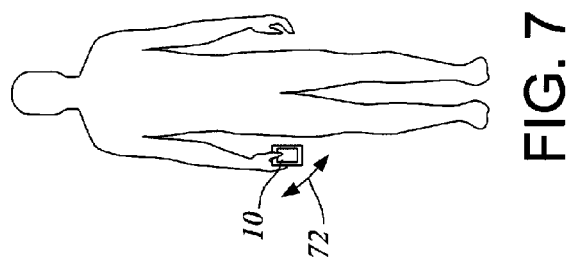
FIG. 7 is a user imparting a motion on the mobile communications device by walking.

Referring again to the flowchart of FIG. 2, as well as to the example graphical user interface shown in FIG. 6, the method for presenting interaction sequences to the user continues with a step 206 of displaying interaction sequence invocation instructions 70 within the overlay 64. In other words, the user is prompted as to what motion or gesture action to perform in order to display the interaction sequence. The interaction sequence invocation instructions 70 as shown in FIG. 6 prompt the user to start walking. An additional hint as to how many steps are necessary to so invoke the interaction sequence, e.g. twenty steps, may also be displayed. The user begins walking as shown in FIG. 7, and the motion subsystem 44 detects the motion 72 imparted on the mobile communications device 10 and receives this as a second external input in accordance with a step 208. It was mentioned above that in certain embodiments, the haptic contact on the touch screen 22 constituted the first external input. In this regard, this second external input on the motion subsystem 44, that is, one or a combination of the accelerometer 46, the gyroscope 48, and the compass 50, is understood to be different from such first external input and the input modalities involved therewith.

Figure 8:
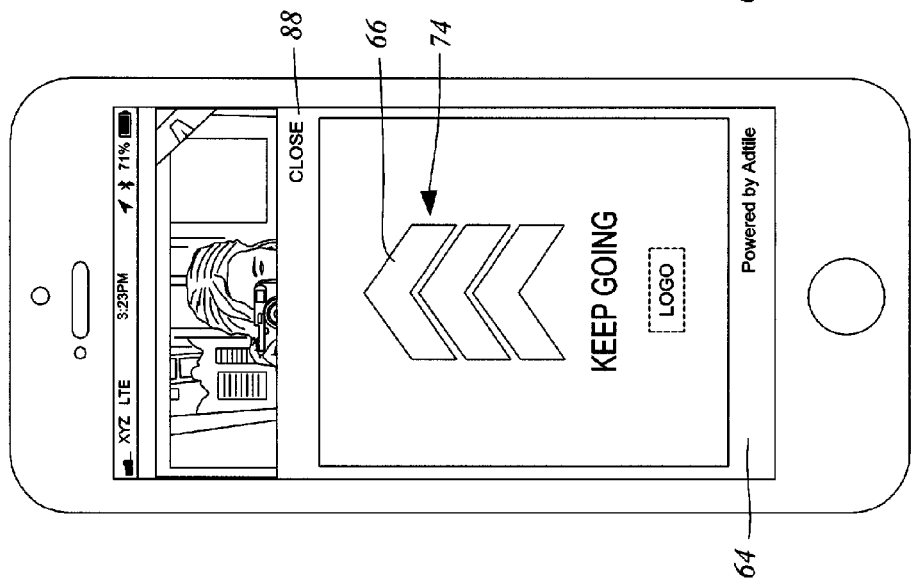
FIG. 8 shows the graphical user interface displaying a progress indicator.

The captured second external input is thereafter translated to at least a set of quantified values in accordance with step 210. The second external input could be one set of data captured in one time instant as would be the case for direction and orientation, or it could be multiple sets of data captured over multiple time instances that represent a movement action. Where multiple sets of data are required to detect an action from the user, a progress indicator towards the completion thereof may be displayed on the overlay 64. FIG. 8 depicts one such exemplary progress indicator 74 that also instructs the user to "keep going." With each step that is detected, another animation effect may be applied to the transition graphic 66 that indicates the same to the user. The progress indicator 74 is updated during the step of receiving the second external input, and so these processes are understood to occur concurrently. None of the steps of the method disclosed herein should be deemed to require sequential execution.

Figure 9:
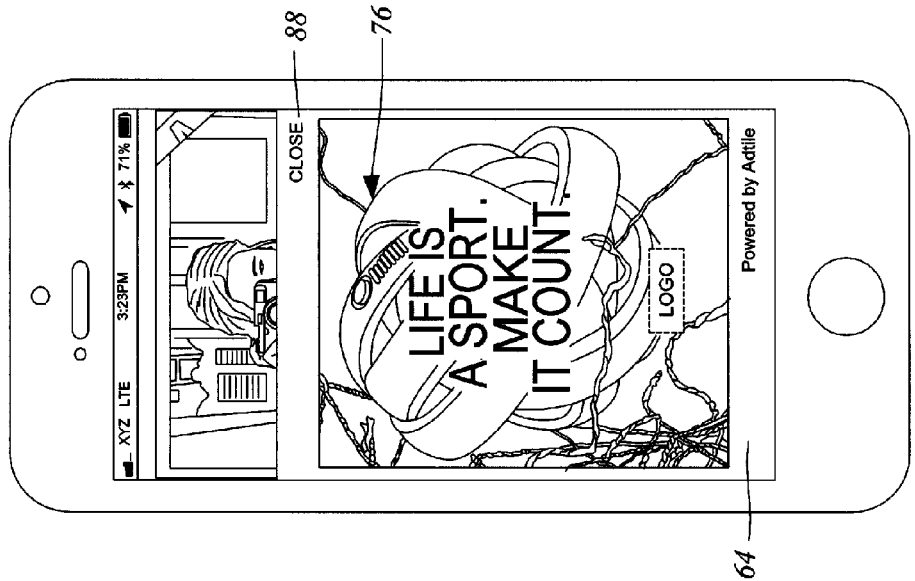
FIG. 9 shows the graphical user interface displaying an interaction sequence completion content after the user has provided the input therefor.

With additional reference to FIG. 9, the method for presenting interaction sequences continues with a step 212 of displaying interaction sequence content 76 within the overlay 64. This step takes place in response to a substantial match between the set of quantified values translated from the received second external input, e.g., the motion 72, to a set of predefined values corresponding to the interaction sequence invocation instruction 70. In further detail, the set of predefined values is understood to include data that would be measured by the accelerometer 46, and is known to be correlated to the user walking with the mobile communications device 10. Within a predetermined threshold of such data, if the set of quantified values translated from the second external input as measured by the same accelerometer 46 is matching, then it is determined that the user was walking. Various algorithms to determine such matches are known in the art, and any one can be substituted without departing from the scope of the present disclosure.

The display of the interaction sequence content 76 need not be static, and may be modified according to other inputs being concurrently provided to the mobile communications device 10. For instance, a different graphic may be displayed in instances where the mobile communications device 10 is truly stationary, versus instances where the mobile communications device 10 is stationary but within a moving object such as a train, automobile, and the like. Where animated graphics are used as the interaction sequence content 76, the playback speed can also be adjusted depending on the circumstances.

Figure 11:
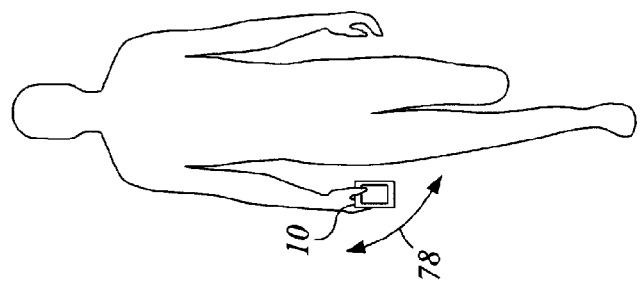
FIG. 11 is a user imparting a motion on the mobile communications device by running.
Figure 10:
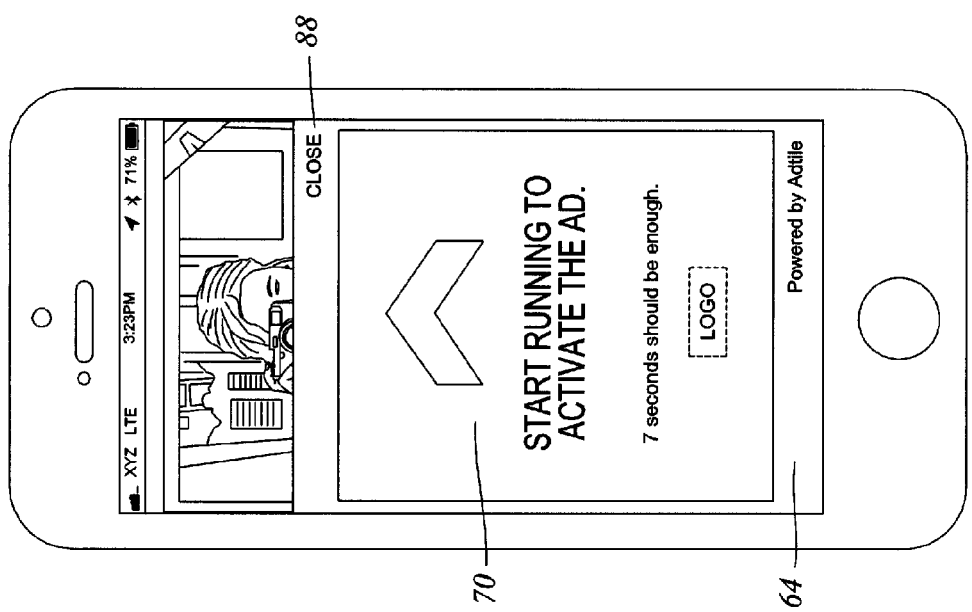
FIG. 10 shows the graphical user interface displaying a variation of the interaction sequence invocation instructions directing the user to run.

Other types of gestures and motions that can be imparted on the mobile communications device 10 by the user are also contemplated. For example, FIG. 10 illustrates the interaction sequence invocation instructions 70 directing the user to begin running. By way of the user so running with the mobile communications device 10 as shown in FIG. 11, another motion 78 is imparted. The set of quantified values may have a greater magnitude than the walking motion 72, but similarly defined by measurements read from the accelerometer 46. Again, these readings can be compared to predefined values that are known to correlate to a running motion. When there is a match, the interaction sequence content 76 can be displayed as described above.

Figure 13:
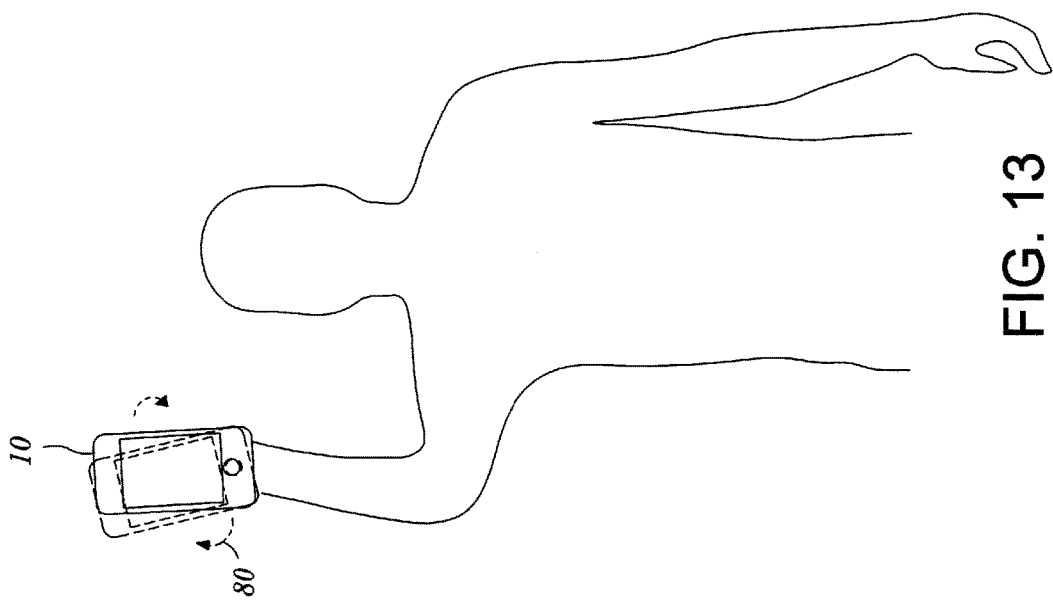
FIG. 13 is a user imparting another motion on the mobile communications device as instructed in FIG. 10.
Figure 12:
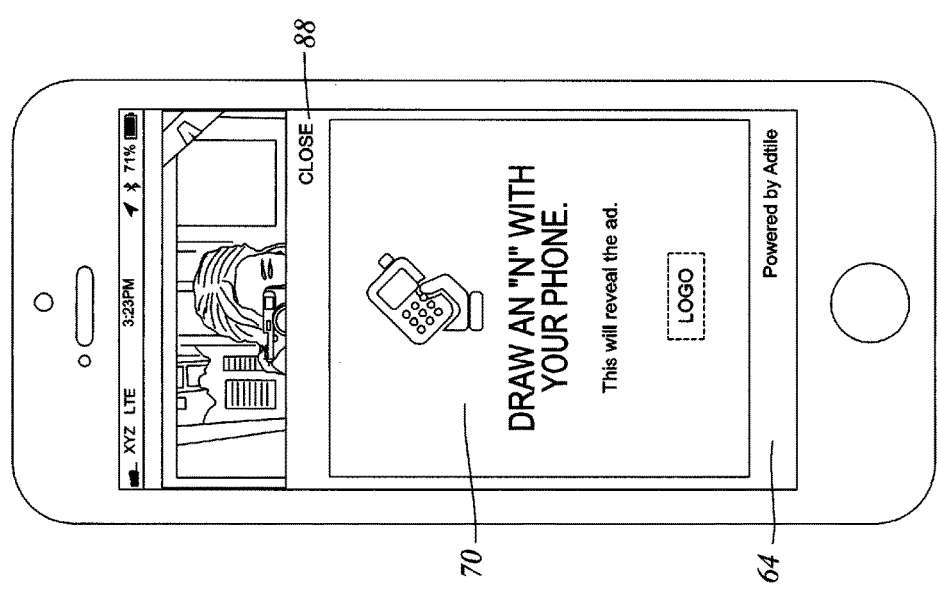
FIG. 12 shows the graphical user interface displaying another variation of the interaction sequence invocation instructions directing the user to input a gesture of a letter to display the interaction sequence completion content

FIG. 12 shows the interaction sequence invocation instructions 70 for yet another different gesture/motion that can be imparted on the mobile communications device 10 to invoke the interaction sequence content 76. FIG. 13 illustrates the mobile communications device 10 being moved accordingly, per motion 80. In the illustrated example, the user is directed to draw an alphabet character "N," which may be related to the sponsor's branding. Along these lines, the particular gestures and motions requested can relate in this manner to the provider/sponsor of the content 76. For example, a running action can be suitable for those that sell athletic goods, while a shaking motion could be appropriate for juice bars, and so forth. Those having ordinary skill in the art will recognize suitable matching of a given sponsor with appropriate gestures. These gestures may be more accurately measured by the gyroscope 48, or a combination of the gyroscope 48 and the accelerometer 46.

Figure 14:
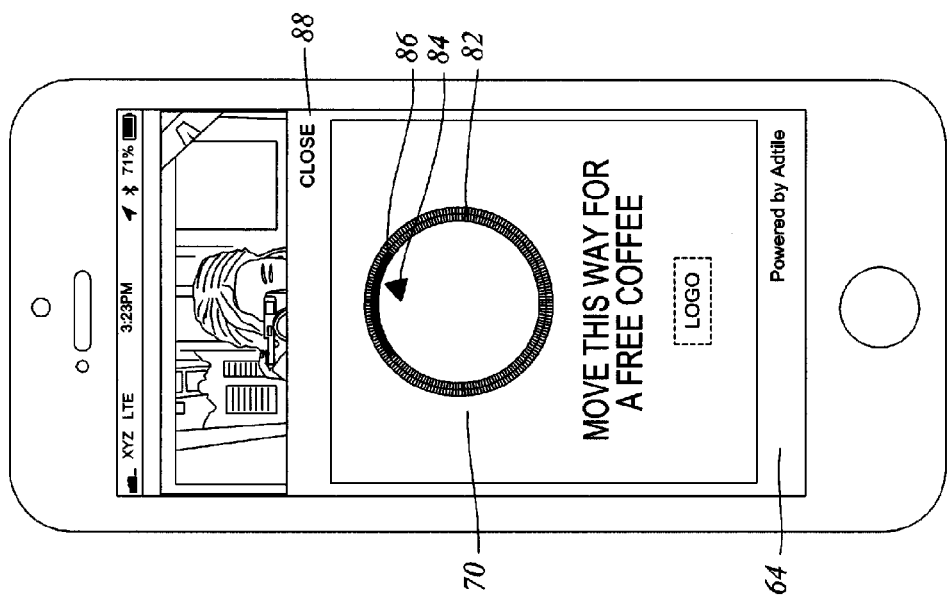
FIG. 14 shows the graphical user interface displaying yet another variation of the interaction sequence invocation instructions directing the user to face and walk a certain direction to display the interaction sequence completion content.

Yet another motion/gesture can be requested as shown in the interaction sequence invocation instructions 70 of FIG. 14. In particular, this prompts the user to face and walk in a certain direction. There is a directional indicator 82 that shows a current direction 84 and a guided direction 86 that corresponds to a predetermined direction set by the sponsor. The direction measurements are understood to be made by the compass 50, and in this example, additional readings from the gyroscope 48 and/or the accelerometer 46 can be used to determine whether the user is walking in the direction as prompted by the interaction sequence invocation instructions 70. One possible use for this feature may be to direct the user to the nearest retail branch of the sponsor. These motions can be coupled with granting incentives such as free goods/services when the user complies with the prompted interaction sequence invocation instructions. In the illustrated example of a coffee chain, walking in a direction toward the closest branch may yield a free coffee coupon. Other types of incentives, coupons, and free items could be offered in exchange for performing the actions prompted in the interaction sequence invocation instructions 70, including contest entries for more expensive items also offered by the sponsor.

As indicated above, the second external input, which is understood to be motion and/or gesture inputs captured via the accelerometer 46, the gyroscope 48, and the compass 50. Generally, the measurements or data from these components serve as a basis for invoking the interaction sequence, and in one embodiment contemplates the use of the raw measured values, and so any comparison/evaluation operations thereof may utilize static constants that are optimized for a particular assumed position and orientation of the mobile communications device 10.

It is contemplated that the foregoing second external inputs can be utilized in a variety of different contexts, and so its capture and evaluation may be described in terms of broad categories including tilt, relative heading, position, shake, and pedometer, and implemented as a series of modules therefor. In further detail, the tilt module may have different varieties, for example, vertical tilt and horizontal tilt. With vertical tilt, the interaction is the user tilting the device forward or backwards, whereas with horizontal tilt, the interaction is user tilting the device to the left or to the right. The functionality remains the same regardless of the initial orientation of the device (upright, face-up, face-down, or upside-down) because of calibration function, the details of which will be considered more fully below. When the mobile communications device 10 is held sideways, the window orientation is checked, triggering a switch/lock so that the horizontal and vertical tilts remain consistent The relative heading module allows the user to interact with the mobile communications device by panning to the left or to the right, as discussed more generally above. Like the tilt module, the inputs to the interaction sequences can be captured when the mobile communications device 10 is held upright, face-up, face-down, or upside-down. Similarly, when the mobile communications device 10 is held sideways, the window orientation is checked, such that a switch/lock is triggered to ensure that the display, that is, the interaction inputs, remains consistent and reacts intuitively.

The position module is understood to register inputs when the mobile communications device is moved into a new position. The position may be approximated by reading data from the accelerometer 46, and is understood to independent of the display orientation. It is understood that the orientation is used to transform the accelerometer axes from a frame relative to the body, to a frame relative to the surrounding environment or world.

Further, the shake module utilizes the accelerometer 46 to measure when the mobile communications device 10 is shaken. The capturing of the inputs is understood to be independent of the mobile communications device 10, and the display orientation. According to one embodiment, the magnitude of the motion imparted triggers the shake event.

The pedometer module is understood to count the steps that the user takes during the interaction sequence. It is possible to distinguish between forward, backward, and side steps, and can function when the mobile communications device 10 being in the face-up, upright, or face-down orientations. Furthermore, correct direction can be ascertained while the mobile communications device 10 is in the upside-down or sideways orientations by using the initial orientation to transform the world frame, similar to the position module discussed above.

Because there are no particular restrictions in the way the mobile communications device 10 can be used, how the user is situated, or how the user chooses to maneuver the mobile communications device 10 is unknown. In most cases, it can be assumed that the user is sitting or standing upright while holding the mobile communications device 10 at a comfortable viewing angle. Other potential situations include the user laying down and holding the device up-side down and above, or laying on the side with the mobile communications device 10 being in a landscape orientation relative to the viewing perspective of the user, but actually in a portrait orientation relative to the ground.

In order to accommodate interaction from different orientations and the variability of the user actions, the method contemplates an optional step 203 of calibrating the mobile communications device 10 to an initial angular orientation, then determining gestures and motions from measured values that are relative to such initial angular orientation. As will be described in further detail below, a general framework to handle these variables are contemplated in accordance with different embodiments of the present disclosure. Thus, the interaction sequence can function adaptively to give the user a natural and uninterrupted experience. The calibration step may take place once the first external input corresponding to the triggering of the activatable graphic element 62 is received, or concurrently with the displaying of the overlay 64 on the graphical user interface 54. During any delay associated with this calibration step, and animation or other graphic may be displayed so as to become a seamless part of the user experience. It is contemplated that this calibration feature allows the user to provide the second external input from any position or angle.

Prior to commencing the various interaction sequences described above, the orientation of the display is considered, that is, whether the device is displaying in Portrait or Landscape orientation. Preferably, the interaction sequences are in portrait orientation, but landscape orientation may also be accommodated. In this regard, it is possible to translate the device orientation sensors into the new display frame.

According to one embodiment, an initialization reading of the device orientation can be performed in response to step 202 of receiving the first external input that triggers the activatable graphic element 62. In this regard, the initialization reading may occur concurrently with the step 204 of displaying of the overlay 64 on the graphical user interface 54, which, as noted above, is likewise in response to receiving the first external input. The initialization reading may utilize either the measured position/angular orientation from a single measurement, or averaged readings from multiple measurements so that a more stable initial angular orientation may be determined. It is understood that this initial reading provides the offset from a default or standard orientation, e.g., where the face of the phone is vertical or 90 degrees relative to the ground.

After the initial reading is made, according to one embodiment, the orientation, which is provided by the accelerometer in terms of vector magnitudes in multiple axes, is translated into quaternions. As will be recognized by those having ordinary skill in the art, quaternions can better represent rotating objects, whereas yaw, pitch, and roll quantify a degree of movement measured along three axes. That is, objects can be rotated in quaternions, but the measurement of how much an object has rotated in terms of yaw, pitch and roll, are not possible. With quaternions, after calibration, the current or initial coordinate system may be rotated to a preferred coordinate system such as when the mobile device is facing up with a multiplication of Givens rotation matrices.

Quaternions are understood to simplify the rotation of orientation over conventional subtraction and addition of angle measurements. It is understood to be a simple and memory efficient procedure that does not require extensive data processing resources. Different mobile platforms utilize pitch measurements differently; for example, Android mobile devices specify pitch measurements offset by −90 degrees as compared to iOS mobile devices. Furthermore, there may be coordinate cutoffs, for example, 360 degrees is less than 1 degree for yaw, pitch varying between −90 and +90 degrees, and so forth. These variables would render any transformation from one coordinate system to another a non-trivial operation subject to the particulars of the mobile platform, and interoperability becomes challenging. Quaternions, on the other hand, are always the same and independent of the underlying mobile operating system.

The appropriate rotation matrix is calculated, which is then used to transform the initial position to the normalized, face-up orientation. Subsequent orientation values may be measured as the user interacts with the overlay 64, each of which may be translated into quaternions, multiplied by the inverse of the pre-calculated rotation matrix, and the transformed quaternions are translated back to orientation angles. In general, the foregoing procedure is understood to read in orientation measurements from a world coordinate system, and returns the orientation reading in a coordinate system that is relative to the initial orientation. This data, in turn, is used to generate corresponding changes in the overlay, such as switching to alternative views, screens, and so forth. According to some embodiments, the graphical output responds directly to the calculated position data. In this case, the stream of position/orientation data may be filtered or smoothed to counterbalance potential sensor error.

The foregoing examples illustrate that multiple inputs to the motion subsystem 44 can be used in sequence to correlate various actions by the user. However, it is also possible to utilize and prompt for single actions.

With data from the accelerometer 46, the gyroscope 48, and/or the compass 50 being requested on a regular basis to present a seamless response to motion inputs, such devices are understood to be in a constant state of activation. This increases power consumption, and decreases battery life, so to optimize power usage, these devices may be deactivated once the interactive sequence content 76 is displayed.

Figure 15:
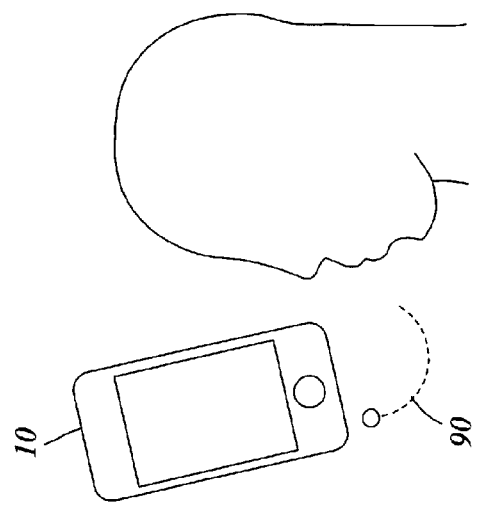
FIG. 15 is a user inputting voice to the mobile communications device to invoke an interaction sequence completion content.

Although the previous interaction sequence invocation instructions 70 each involved a motion or gesture that is measured by the motion subsystem 44, it is possible to use the other inputs of the mobile communications device 10 to similarly activate the interaction sequence content 76. For example, FIG. 15 illustrates the user providing a voice input 90 to the audio subsystem 26. One possible interaction sequence invocation instruction 70 may prompt the user to "say brand name to activate the ad." With the on-board voice recognition capabilities, a match of the user speaking the brand name can be used to display the interaction sequence content 76. Another possible interaction sequence invocation instruction 70 may prompt the user to input a facial gesture (e.g., a smile) that is captured by the camera 36. Hand gestures that can be captured as a sequence of images can also be used to display the interaction sequence content 76.

The outputs generated throughout the steps of the method are all within the overlay 64, and designed to complement the native environment. Thus, it is possible to show the instructions, receive the input, and display the interactive sequence content within the same main screen area 56 of the underlying app, without the need for leaving or exiting out of the same. Along these lines, whenever the overlay 64 is displayed, the user has the option to close the same and return to the underlying app by tapping a close button 88. The familiar entertainment and discovery that the user has come to expect from the app are still readily accessible, as the underlying app continues to run in the background. It is contemplated that sponsors will be able to attain superior brand engagements and drive messaging that imaginatively involves the user on a deeper level.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method for calibrating an orientation of a mobile communications device, the method comprising:
    activating, from a data processor of the mobile communications device, one or more sensors integrated in the mobile communications device;
    requesting, by the data processor, an initialization sensor reading from the one or more sensors of the mobile communications device corresponding to an initial orientation of the mobile communications device, the initialization sensor reading including vector magnitudes along a plurality of motion axes;
    translating, with the data processor, the vector magnitudes of the plurality of motion axes to a set of quaternions;
    requesting, by the data processor, a mobile platform identifier from the mobile communications device;
    correlating the requested mobile platform identifier to a platform-specific coordinate system; and
    transforming the set of quaternions corresponding to the initialization sensor reading to the platform-specific coordinate system with a rotation matrix.

2. The method of claim 1, wherein the one or more sensors include an accelerometer.

3. The method of claim 1, wherein the initialization sensor reading includes a plurality of measurements from one of the sensors.

4. The method of claim 1, wherein the initialization sensor reading includes a plurality of measurements from more than one of the sensors.

5. A method for presenting interaction content to a user on a mobile communications device, the method comprising:
    displaying content on a graphical user interface of the mobile communications device, an activatable in-stream graphic element being displayed in-line with the content;
    receiving a first external input corresponding to a triggering of the activatable in-stream graphic element, the first external input being received on a first input modality of the mobile communications device;
    displaying an overlay in the graphical user interface partially covering the content in response to receiving the first external input corresponding to the triggering of the activatable in-stream graphic element;
    in response to receiving the first external input, activating one or more sensors of the mobile communications device;
    requesting an initialization sensor reading from the one or more sensors of the mobile communications device, the initialization sensor reading corresponding to an initial orientation of the mobile communications device;
    generating an initial orientation offset from a standard orientation based upon the requested initialization sensor reading;
    displaying, within the overlay, interaction sequence invocation instructions in response to receiving the first external input;
    receiving a second external input on a second input modality of the mobile communications device different from the first input modality after the first external input corresponding to the triggering of the activatable in-stream graphic element is received and while the interaction sequence invocation instructions are being displayed within the overlay;
    translating the second external input to at least a set of quantified values; and
    displaying, within the overlay, content separate from the interaction sequence invocation instructions upon an evaluation of a substantial match between the set of quantified values translated from the received second external input with the initial orientation offset applied thereto and the set of predefined values based upon the standard orientation corresponding to the interaction sequence invocation instructions, wherein
    the initialization sensor reading includes a plurality of measurements from more than one of the sensors,
    the one or more sensors includes an accelerometer,
    the initialization sensor reading from the accelerometer include vector magnitudes in a plurality of motion axes, and
    the method further comprises:
    translating the vector magnitudes of the plurality of motion axes to a set of quaternions that define a motion of the mobile communications device;
    requesting a mobile platform identifier from the mobile communications device:
    correlating the requested platform identifier to a platform-specific coordinate system; and
    transforming the set of quaternions corresponding to the initialization sensor reading to the platform-specific coordinate system with a rotation matrix.

6. The method of claim 5, further comprising:
    generating a calibration progress indicator on the overlay during the step of generating the initial orientation offset.

7. The method of claim 5, wherein the initialization sensor reading is a single measurement from one of the sensors.

8. The method of claim 5, wherein the initialization sensor reading includes a plurality of measurements from one of the sensors.

9. The method of claim 5, wherein the one or more sensors includes a gyroscope.

* * * * *